(12) United States Patent
Borger et al.

(10) Patent No.: US 8,735,509 B2
(45) Date of Patent: May 27, 2014

(54) USE OF POLYORGANOSILOXANES IN THE PROCESSING AND VULCANISATION OF RUBBER

(75) Inventors: Volker Borger, Hamburg (DE); Uwe Dittrich, Radebeul (DE); Theresia Klose, Dresden (DE)

(73) Assignee: Schill + Seilacher "Struktol" GmbH, Hamburg (DE)

( * ) Notice: Subject to any disclaimer, the term of this patent is extended or adjusted under 35 U.S.C. 154(b) by 0 days.

(21) Appl. No.: 13/575,894

(22) PCT Filed: Feb. 3, 2011

(86) PCT No.: PCT/EP2011/051548
§ 371 (c)(1),
(2), (4) Date: Nov. 5, 2012

(87) PCT Pub. No.: WO2011/095538
PCT Pub. Date: Aug. 11, 2011

(65) Prior Publication Data
US 2013/0046059 A1 Feb. 21, 2013

(30) Foreign Application Priority Data
Feb. 3, 2010 (EP) ..................................... 10152577

(51) Int. Cl.
*C08F 283/12* (2006.01)

(52) U.S. Cl.
USPC ........................................................ 525/479

(58) Field of Classification Search
USPC ........................................................ 525/479
See application file for complete search history.

(56) References Cited

U.S. PATENT DOCUMENTS

| | | | |
|---|---|---|---|
| 4,172,101 | A | 10/1979 | Getson |
| 4,293,678 | A | 10/1981 | Carter et al. |
| 4,503,208 | A | 3/1985 | Lin et al. |
| 4,560,719 | A | 12/1985 | Nakamura et al. |
| 4,698,406 | A | 10/1987 | Lo et al. |
| 5,010,137 | A | 4/1991 | Umeda et al. |
| 5,256,754 | A | 10/1993 | Takarada et al. |
| 5,593,787 | A | 1/1997 | Dauth et al. |
| 5,952,419 | A | 9/1999 | DeGroot, Jr. et al. |
| 6,140,393 | A | 10/2000 | Bomal et al. |
| 6,140,450 | A | 10/2000 | Ishikawa et al. |
| 6,245,834 | B1 | 6/2001 | Bomal et al. |
| 6,372,843 | B1 | 4/2002 | Barruel et al. |
| 2004/0023926 | A1 | 2/2004 | Guennouni et al. |
| 2004/0116593 | A1 | 6/2004 | Lai et al. |
| 2004/0266940 | A1 | 12/2004 | Issari |
| 2005/0079928 | A1 | 4/2005 | Kataoka et al. |
| 2005/0143514 | A1 | 6/2005 | Guerin |
| 2007/0032609 | A1 | 2/2007 | Barfurth et al. |
| 2007/0249772 | A1 | 10/2007 | Chorvath et al. |
| 2011/0178249 | A1 | 7/2011 | Dittrich et al. |

FOREIGN PATENT DOCUMENTS

| | | |
|---|---|---|
| CN | 1678664 | 10/2005 |
| DE | 30 44 237 | 9/1981 |
| EP | 0 247 501 | 12/1987 |
| EP | 0 269 114 | 6/1988 |
| WO | 99/02580 A1 | 1/1999 |
| WO | 2007/033801 | 3/2007 |

OTHER PUBLICATIONS

International Search Report dated Mar. 25, 2010 in related PCT/EP2009/005541 filed Jul. 30, 2009.
International Preliminary Report on Patentability dated Feb. 8, 2011 in related PCT/EP2009/005541 filed Jul. 30, 2009.
European Search Report dated Feb. 16, 2009 in related EP 08013752.4 filed Jul. 31, 2008.
Dow Corning Corporation Material Safety Data Sheet, Silastic(R) GP-50 Silicone Rubber, Jan. 22, 2011.
Office Action dated Nov. 30, 2011 in related U.S. Appl. No. 13/056,454, filed Jan. 28, 2011.
Office Action dated May 31, 2012 in related U.S. Appl. No. 13/056,454, filed Jan. 28, 2011.
International Search Report and Written Opinion dated Dec. 1, 2011 in corresponding PCT/EP/2011/051548 filed on Feb. 3, 2011.
Translation of International Preliminary Report on Patentability dated Sep. 20, 2012, in corresponding PCT/EP/2011/051548 filed on Feb. 3, 2011.

*Primary Examiner* — Kuo-Liang Peng
(74) *Attorney, Agent, or Firm* — Hovey Williams LLP

(57) ABSTRACT

The invention relates to the use of polyorganosiloxanes having 3 or more siloxane units, which have one or more organic fractions $R^1$, where $R^1$ has one or more carbon-carbon multiple bonds and at least 4 carbon atoms, and wherein the presence of hydrocarbon fractions having a chain length of 5 to 50 carbon atoms is excluded, as additives in the processing of rubber. The polyorganosiloxanes are used in the processing and vulcanization of rubber in a quantity of 0.1 to 10 phr and incorporated by reaction in same. Said polyorganosiloxanes produce a reduction in the viscosity of the rubber during processing and optionally an improvement in the mechanical properties of the vulcanized rubber.

13 Claims, No Drawings

USE OF POLYORGANOSILOXANES IN THE PROCESSING AND VULCANISATION OF RUBBER

RELATED APPLICATIONS

This application claims priority to PCT International Patent Application No. PCT/EP2011/051548, filed Feb. 3, 2011, which claims the priority benefit of EP Patent Application No. 10152577.2, filed Feb. 3, 2010, both of which are hereby incorporated by reference in their entirety.

The present invention relates to the use of polyorganosiloxanes as an additive in the processing of rubber. The polyorganosiloxane can be used as a pure substance, as a masterbatch, or as a blend. The invention further relates to a process for peroxidic vulcanization of rubber and to a vulcanized rubber (vulcanizate).

Various rubber types and rubber mixtures can be processed only with difficulty due to their high viscosity or their tendency to adhere too strongly on the roller system or in the internal mixer. For example, in the case of processing by injection molding, it may be the case that not all cavities of a mold are filled, which results in a high reject rate. For this reason, flow improvers (viscosity reducing agents) are added as additives to the rubber. For example, it is customary to add fatty acid derivatives, waxes or silicone compounds as flow improvers.

The use of flow improvers reduces the viscosity of the rubber in the course of processing, as desired. However, the rubber is also diluted by the addition of the flow improver. The result of this is that the mechanical properties of the vulcanized rubber generally deteriorate compared to a rubber vulcanized without flow improver. Moreover, in the case of addition of flow improvers in particular cases, especially at high additive concentrations, the occurrence of usually undesired exudance in the vulcanizate obtained is observed.

It is also known that the desired mechanical properties (such as compression set, modulus and elongation at break) of rubber can be improved or actually achieved in the first place by vulcanization. Vulcanization crosslinks the long-chain rubber molecules, and the raw rubber with plastic properties forms vulcanized rubber with elastic properties (vulcanizate). A rubber can be crosslinked in various ways. For example, for the crosslinking, sulfur can be used in conjunction with the known accelerator systems, or organic peroxides, for example bis(1-methyl-1-phenylethyl) peroxide (dicumyl peroxide). Peroxidic crosslinking is preferred in particular cases, since selected mechanical values, for example the compression set, are improved compared to sulfur vulcanization. More particularly, the thermal stability (aging resistance) of the vulcanizate obtained by peroxidic vulcanization is distinctly superior to a vulcanizate which has been crosslinked with sulfur. The reason for this is the higher dissociation energy of carbon-carbon bonds compared to carbon-sulfur or sulfur-sulfur bonds.

In the present description, the term "rubber mixture" is used synonymously with the term "rubber", because mixtures of different rubber types are frequently used.

Many rubbers, for example natural rubber (NR) and ethylene-propylene-diene monomer rubber (EPDM), can be vulcanized either with sulfur or with peroxides. Other rubbers in turn, for example ethylene-acrylate rubber (ABM), can be vulcanized with different vulcanization systems (diamines, peroxides), but not with sulfur.

Known flow improvers for rubber are, for example, silicones. For instance, the product Struktol® WS 180 (Schill+Seilacher "Struktol" GmbH, Hamburg, Federal Republic of Germany) is a condensation product of fatty acid derivatives and silicones.

EP 0 247 501 A2 relates to a process for preparing methacryloyloxy- or acryloyloxy-containing organosilanes and organosiloxanes. The preparation of γ-methacryloyloxypropyl-trimethoxysilane is disclosed. No use of the products is taught.

U.S. Pat. No. 4,172,101 A discloses organopolysiloxanes containing vinyl groups for curable compositions, which comprise particulate material produced in situ.

US 2004/0116593 A1 relates to polysiloxane prepolymers with a high refractive index, which are usable for production of biologically compatible medical parts, such as intraocular lenses.

US 2004/0266940 A1 discloses vulcanizable elastomeric compositions and deformable thermoplastic compositions which can be reshaped after vulcanization or curing. The polymer compositions comprise a finely divided material or powder of a meltable polymer incorporated in a matrix of another polymer. The crosslinkable matrix polymer component provided is preferably a hot-vulcanizable silicone composition which includes reactive polyorganosiloxanes having reactive functional groups such as vinyl or allyl groups or (meth)acrylate groups.

U.S. Pat. No. 5,952,419 A discloses vulcanizable organosiloxane-polyisobutylene compositions. Corresponding vulcanized elastomers have improved stability with respect to gas and vapor permeability.

WO 2007/033801 A1 teaches a rubber compound. The compound comprises rubber (A) with at least 2 functional groups crosslinkable via hydrosilylation, a hydrosiloxane or hydrosiloxane derivative having at least 2 SiH groups per molecule as a crosslinker (B), a hydrosilylation catalyst system (C), at least one filler (D) and a coagent crosslinkable via hydrosilylation (E). In the presence of basic constituents, as typically used as catalysts, in the compound, component (B) can decompose.

EP 0 269 114 A2 describes a process for preparing acryloyloxy-containing organopolysiloxanes. This involves reacting epoxy groups of polyorganosiloxanes with acrylic acid or methacrylic acid, and thereby opening them, and subsequently allowing the resulting hydroxyl groups to react by reaction with acryloyl chloride or methacryloyl chloride in the presence of a hydrogen chloride acceptor. Examples of epoxy groups are glycidyl ether and cyclohexyl epoxide groups. The polyorganosiloxanes can be cured, in which case the resulting cured products can be used as adhesive, paint, coating or release agent for various surfaces, such as glass, ceramic, metal, resins, paper, fibers, etc.

DE 30 44 237 A1 discloses acrylated epoxysilicones and preparations comprising them. The acrylated epoxysilicones are the reaction product of an epoxysilicone with an acrylic acid and are used in radiation-curable formulations. They cure to give a high-gloss finish, which is suitable, for example, as a varnish over a printing ink.

US 2005/0079928 A1 relates to a rubber composition for a golf ball having improved rebound and minimized rebound decline at low temperature. For this purpose, a base rubber (A) is reacted with (B) unsaturated carboxylic acid and/or metal salt thereof and (C) organic peroxide. The base rubber (A) comprises (meth)acryloyloxy-modified silicone polymer and optionally peroxidically crosslinkable rubber. In an amount of less than 11 phr, rebound is poor and rebound decline at low temperature is noticeable.

US 2005/0143514 A1 relates to a composition with improved flowability. The composition comprises an HNBR and an organopolysiloxane having at least one hydrocarbyl radical having fewer than 4 carbon atoms.

U.S. Pat. No. 5,010,137 A discloses a rubber composition comprising polyorganosiloxane and organic rubber. 0.02 to 10 mol % of the organo groups of the polyorganosiloxane are vinyl groups.

U.S. Pat. No. 4,560,719 A relates to a flame-retardant polyolefin-based rubber composition. The composition is said to have good flame retardancy and mechanical properties. The composition necessarily comprises organopolysiloxane, the organopolysiloxane used in the examples containing organic groups of which 3 mol % are vinyl groups.

US 2004/0023926 A1 relates to polyorganosiloxanes bearing activated ethylenic double bonds of the maleimide type. The polyorganosiloxanes are intended to serve as coupling agents between the surface of the particles of silicatic fillers and the elastomer, as a result of which the filler is simultaneously dispersed into the elastomer matrix in a simpler manner. The polyorganosiloxanes are used in an amount of 1% to 20%, based on the weight of the filler.

U.S. Pat. No. 6,140,450 A relates to a modified polysiloxane which is used in an amount of up to 50 phr in a rubber composition for the tread of a tire.

For applications which require a high oxidation resistance, preference is given to using rubber without unsaturated functionalities (for example double bonds) in the molecule chain. Rubber without unsaturated functionalities is not vulcanizable with sulfur and is typically crosslinked with peroxides.

The degree of crosslinking achievable in peroxidic vulcanization depends on several factors and is insufficient in particular cases, and so preference is given to adding crosslinking aids (coagents). By means of such coagents, the crosslinking density is increased, and hence a further improvement in the mechanical values is achieved compared to a vulcanization without crosslinking aids. Known representatives for crosslinking of rubbers by peroxidic vulcanization are triallyl cyanurate (TAC), triallyl isocyanurate (TAIL), trimethylolpropane trimethacrylate (TMPTMA), ethylene glycol dimethacrylate (EDMA), 1,6-hexanediol diacrylate (HDDA) or N,N'-m-phenylenebismaleimide (MPBM).

It is possible to counteract the undesired deterioration in the mechanical properties of the vulcanizate which is possible in the case of use of flow improvers by using a particularly high amount of coagents. Such an addition of coagents leads to compensation for the dilution effect of the flow improver. However, the use of coagents generally does not make any contribution to lowering the Mooney viscosity, but merely adds a further constituent to the rubber mixture. The poor solubility of polar coagents in nonpolar rubbers can also lead to inhomogeneities in the network to be formed. This effect is correspondingly more pronounced at higher dosages.

Tight limits are thus set for the unvulcanized rubber processor/vulcanized rubber manufacturer: Firstly, the rubber must have good processability and should therefore contain flow improvers; secondly, the mechanical properties of the vulcanized rubber should not deteriorate undesirably as a result of addition of the flow improver. Furthermore, it is undesirable in most cases that the flow improvers added exude to arrive at the surface of the rubber mixture or of the vulcanizate. The maintenance of the mechanical properties necessitates the addition of (comparatively large amounts of) coagents, which can likewise be disadvantageous as mentioned.

It was an object of the present invention to provide compounds which can help to improve the viscosity of rubber in the course of processing, without deterioration in the mechanical properties of the resulting vulcanizate (for example, the modulus falls). Preferably, compounds should be provided which both lower the viscosity of the rubber mixture in the course of processing and improve the mechanical properties of the vulcanizate obtained after the vulcanization.

According to the invention, it has been found that, surprisingly, this object is achieved by the use of particular polyorganosiloxanes as an additive in the processing of rubber, the amount of polyorganosiloxane used being 0.1 to 10 parts by weight based on 100 parts by weight of rubber (mixture) (parts per hundred rubber, phr).

The characterizing feature of the polyorganosiloxanes used in accordance with the invention is that they have 3 or more siloxane units and one or more organic moieties $R^1$, where $R^1$ has one or more carbon-carbon multiple bonds and at least 4 carbon atoms. In the polyorganosiloxanes used in accordance with the invention, the presence of one or more long-chain hydrocarbon moieties having a chain length of 5 to 50 carbon atoms is excluded.

According to the invention, the polyorganosiloxane, in the (peroxidic) vulcanization, is incorporated by reaction into the rubber, which prevents the formation of exudance at the surface of the vulcanized rubber. The inventive polyorganosiloxane improves the processability and possibly also the crosslinking density of rubbers in the vulcanization. Preferably, both the processability and the crosslinking are influenced positively.

1. Organic Moiety $R^1$

Polyorganosiloxanes used in accordance with the invention have one or more organic moieties $R^1$, where $R^1$ has one or more carbon-carbon multiple bonds and at least 4 carbon atoms.

It is preferred that the carbon-carbon multiple bond in $R^1$ is a carbon-carbon double bond, for example in a carbon chain or a ring of carbon atoms. In a preferred embodiment, the organic moiety $R^1$ is a monovalent radical.

In all embodiments of the invention, particular preference is given to polyorganosiloxanes wherein $R^1$ has at least five carbon atoms, for example at least six and especially at least seven carbon atoms.

It is clear to the person skilled in the art that the inventive polyorganosiloxane must have at least two carbon-carbon multiple bonds in order to be able to have crosslinking action in the rubber. Inventive polyorganosiloxanes thus have at least two carbon-carbon multiple bonds. This means that, when the $R^1$ group has only a single carbon-carbon multiple bond, at least two $R^1$ groups must be present; this embodiment is preferred. Alternatively, it is possible that one $R^1$ group has at least two carbon-carbon multiple bonds, but this embodiment is not preferred because the preparation of the corresponding polyorganosiloxanes is more complex.

Examples of possible $R^1$ groups include cycloalkenyl, alkenyl, norbornyl, (di)cyclopentenyl, or groups derived from methacrylate or acrylate. Preferred monovalent $R^1$ radicals are derived from cyclohexene and (meth)acrylate, which are bonded to the base skeleton of the polyorganosiloxane via a hydrocarbon chain which may be substituted by one or more heteroatoms such as oxygen or sulfur, and/or interrupted by one or more heteroatoms such as oxygen and sulfur.

Particularly preferred examples of $R^1$ are the following groups

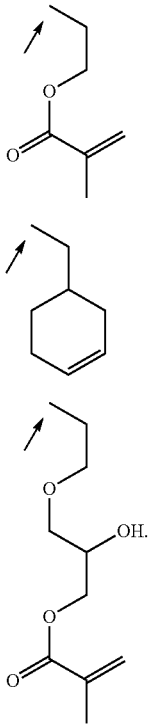

In these structures, the carbon atom which is bonded to the silicon atom is marked with an arrow in each case.

These functionalizations are obtainable by reaction of an SiH unit with a compound which has a double bond amenable to hydrosilylation, for example:

(a) allyl(meth)acrylate,
(b) 4-vinylcyclohexene or
(c) allyl glycidyl ether with subsequent opening of the epoxide ring by reaction with (meth)acrylic acid.

Particular preference is given to reaction c), as a result of which the above structure (z) is formed. Polyorganosiloxanes of this general type are known, for example, from EP 0 269 114 A2 and DE 30 44 237 A1.

The number of carbon atoms between the silicon atom which bears the $R^1$ group and the carbon-carbon multiple bond is preferably 1 to 10, more preferably 2 to 6, for example 4.

In a preferred embodiment, the polyorganosiloxane used in accordance with the invention has one (or more) vinyl group(s) which is (are) bonded directly to a silicon atom; in this preferred embodiment, in addition to the vinyl group(s), one (or more) moiety(ies) $R^1$ are present. An alternative is a likewise preferred embodiment, in which the polyorganosiloxane used in accordance with the invention does not have a vinyl bonded directly to a silicon atom.

In a preferred embodiment, $R^1$ is present in the polyorganosiloxane used in accordance with the invention as part of the structural unit I $$[R^1{}_x R_a SiO_{[4-(x+a)]/2}] \tag{I},$$

where x is 1, 2 or 3 and is preferably 1, a is 0, 1 or 2, preferably 1 or 2, and R is a monovalent organic radical. Preferably, R is selected from methyl, ethyl, propyl and phenyl, and R is more preferably methyl.

Preferred structural units I where x=1 are a difunctional structural unit $I^D$ where a=1:

$$[R^1 R SiO_{2/2}] \tag{$I^D$},$$

and a monofunctional structural unit $I^M$ where a=2:

$$[R^1 R_2 SiO_{1/2}] \tag{$I^M$}.$$

As mentioned, polyorganosiloxanes used in accordance with the invention do not have any hydrocarbon moiety having a chain length of 5 to 50 carbon atoms.

2. Structure of the Polyorganosiloxane

In addition to the structural unit I mentioned, which is preferably present, inventive polyorganosiloxanes preferably also have the difunctional structural unit $II^D$:

$$[R'_2 SiO_{2/2}] \tag{$II^D$}$$

where the R' radicals are the same or different (and are preferably the same) and are each selected from linear, branched or cyclic organic radicals which may be bonded via an oxygen atom, and the R' radicals are preferably methyl, ethyl, propyl and phenyl, especially methyl.

Preferably, in the inventive polyorganosiloxane, one or—more preferably—two monofunctional structural units $III^M$ is (are) also present:

$$[R''_3 SiO_{1/2}] \tag{$III^M$},$$

where the R'' radicals are the same or different and are each selected from hydroxyl and linear, branched or cyclic organic radicals which may be bonded via an oxygen atom, and the R'' radicals are preferably hydroxyl, methyl, ethyl, propyl and phenyl, especially hydroxyl and methyl. In a particularly preferred embodiment, the R'' radicals are the same and are each methyl groups.

A preferred structure of an inventive polyorganosiloxane is as follows:

$$[I^D]_m [I^M]_n [II^D]_o [[III_M]_{(2-n)}],$$

where
(i) m is in the range from 0 to 40 and n may be 0, 1 or 2, with the proviso that the sum of (m+n) is at least 1, and where the sum of (m+n) is preferably in the range up to 20,
(ii) o is in the range from 0 to 1000 and
(iii) the sum of (m+o+2) is at least 3.

In this structure, the difunctional structural units $I^D$ and $II^D$ in the inventive polyorganosiloxane are typically and preferably not arranged as a block, but rather distributed randomly along the polysiloxane chain. It is also clear to the person skilled in the art that the parameters m, n and o are average values, because the inventive polyorganosiloxanes are typically not obtained as homogeneous compounds in the preparation.

In a preferred embodiment, n is zero (0), i.e. the functionalization $R^1$ is present in difunctional (bridging) structural units $I^D$ in the polyorganosiloxane. Such an embodiment is preferred in particular when the polyorganosiloxane used in accordance with the invention is intended in particular to promote the crosslinking of the rubber in the vulcanization.

In a further preferred embodiment, n is 1 or 2 and preferably 2, i.e. the functionalization $R^1$ is present in the polyorganosiloxane (at least also) in monofunctional (terminal) structural units $I^M$. Such an embodiment is preferred in particular when the polyorganosiloxane used in accordance with the invention is to serve principally for chain extension of the rubber in the vulcanization.

In a preferred embodiment, the total number of siloxane units of the inventive polyorganosiloxanes (m+o+2) is 8 to 1000, more preferably 10 to 250, especially 15 to 100, such as 20 to 90.

In a further preferred embodiment, the sum of the functionalized siloxane units in the inventive polyorganosiloxanes (m+n) is 1.0 to 15, more preferably 1.5 to 10, for example about 2.

The number of difunctional siloxane units $II^D$ unsubstituted by $R^1$ groups (i.e. o) in the inventive polyorganosiloxanes is preferably 6 to 1000, more preferably 8 to 150, especially 13 to 90, such as 18 to 80.

It is possible in accordance with the invention that the polyorganosiloxane used in accordance with the invention contains the carbon-carbon multiple bond as part of a substituent having 7 or more carbon atoms. In that case, the remaining part of this substituent (i.e. minus the carbon atoms of each carbon-carbon multiple bond) is, however, not a hydrocarbon moiety having 5 to 50 carbon atoms, but also has one or more heteroatoms, especially oxygen atoms.

Inventive polyorganosiloxanes may be present as compounds which are liquid at room temperature (25° C.) and have a high viscosity. Depending on factors including the length of the siloxane chain (i.e. sum of the SiO units, sum (m+o+2), from about 30), the inventive polyorganosiloxanes may be solid at room temperature.

It is possible to use the inventive polyorganosiloxane as a masterbatch which comprises
a) one or more rubbers and
b) one or more inventive polyorganosiloxanes.

The masterbatch preferably contains 0.5 to 30 parts by weight of inventive polyorganosiloxane, more preferably 0.5 to 20 parts by weight and especially 0.5 to 10 parts by weight of polyorganosiloxane, based on 100 parts by weight of rubber (phr, parts per hundred rubber). Typically used in the masterbatch as rubbers are peroxidically crosslinkable types, for example natural rubber (NR), polybutadiene (BR), acrylonitrile-butadiene rubber (NBR, HNBR), ethylene-propylene rubber (EPM, EPDM), chlorinated or chlorosulfonated polyethylene (CM, CSM), terpolymers of epichlorohydrin rubber (GECO), fluoro rubbers (FKM, FFKM, TFE/P), acrylate rubbers (ACM, AEM), ethylene-vinyl acetate rubber (EVA, EVM), silicone rubber (VMQ, PMQ, PVMQ, FVMQ), polyoctenamer (Vestenamer), polyurethane rubber or thermoplastic elastomers (TPE).

The use of a masterbatch facilitates the incorporation of the inventive polyorganosiloxane into a rubber.

Furthermore, it is possible to use the inventive polyorganosiloxane in the form of a blend which comprises
a) one or more solid carrier materials (preferably selected from inorganic fillers (for example silica) or waxy materials (for example polyethylene waxes)) and
b) one or more polyorganosiloxanes used in accordance with the invention.

The weight ratio of a) carrier material to b) inventive polyorganosiloxane in the blend is preferably 10/90 to 90/10, more preferably 20/80 to 80/20 and especially preferably about 60/40. Preferred materials for blends are silicas or other inorganic fillers, for example chalk or waxy materials, for example polyethylene waxes.

The use of a blend facilitates especially the handling of the inventive polyorganosiloxanes when they are liquid at room temperature.

Processes for preparing the inventive polyorganosiloxanes are known in the prior art, reference being made inter alia to EP 0 269 144 A2 and DE 30 44 237 A1.

3. Use and Vulcanization Process

According to the invention, the polyorganosiloxanes are preferably used in the processing of rubber, for example to improve the release performance on a roller system or in an internal mixer, to reduce the Mooney viscosity, to increase the modulus of the vulcanized rubber mixture, or tensile strength, to reduce the compression set, to reduce elongation at break and/or to reduce tear propagation resistance. The inventive polyorganosiloxane is optionally used in the form of the masterbatch or of the blend.

The rubber or the rubber phase is preferably peroxidically vulcanizable. For example, can be natural rubber (NR), polybutadiene (BR), acrylonitrile-butadiene rubber (NBR, HNBR), ethylene-propylene rubber (EPM, EPDM), chlorinated or chlorosulfonated polyethylene (CM, CSM), polyisoprene rubber (IR), styrene-butadiene rubber (SBR), chloroprene rubber (CR), polyethylene (PE), acrylonitrile-butadiene rubber (ABS), terpolymers of epichlorohydrin rubber (GECO), fluoro rubbers (FKM, FFKM, TFE/P), acrylate rubbers (ACM, AEM), ethylene-vinyl acetate rubber (EVA, EVM), silicone rubber (VMQ, PMQ, PVMQ, FVMQ), polyoctenamer (Vestenamer), polyurethane rubber or thermoplastic elastomers (TPE). Preferably, however, the inventive polyorganosiloxane is not used in silicone rubber.

Particular preference is given to EPM, EPDM, CSM, FPM, IR, BR, CR, AEM, EVM, EVA, NBR and HNBR, and it is also possible, as mentioned, to use mixtures of the rubber types mentioned.

The amount of polyorganosiloxane used in accordance with the invention is 0.1 to 10 parts by weight per 100 parts by weight of rubber (mixture) (phr, parts per hundred rubber), preferably 0.5 to 10 phr, especially 1 to 10 phr, such as 2 to 8 phr, for example about 4 phr.

The invention further relates to a process for vulcanizing rubber, in which a vulcanization mixture which comprises
(i) one or more peroxidically crosslinkable rubbers (for example NR, BR, NBR, HNBR, EPM, EPDM, CM, CSM, GECO, FKM, FFKM, TFE/P, ACM, AEM, EVA, EVM, VMQ, PMQ, PVMQ, FVMQ or TPE),
(ii) one or more peroxidic vulcanizing agents and
(iii) one or more inventive polyorganosiloxanes, the amount of polyorganosiloxane used being 0.1 to 10 phr,
is peroxidically vulcanized at a temperature of, for example, 120° C. to 250° C. The vulcanization results in the reactive crosslinking of the polyorganosiloxanes used in accordance with the invention via the unsaturated moiety $R^1$.

A vulcanization mixture preferably further comprises additives such as fillers (for example carbon black, silica, calcium carbonate, barium sulfate, zinc oxide, magnesium oxide, aluminum oxides, iron oxides, silicates), plasticizer oils (for example mineral oils), aging stabilizers, peroxide vulcanization aid, further vulcanization aids (for example sulfur), and flame retardants (for example aluminum hydroxide, magnesium hydroxide, calcium hydroxide or phosphorus compounds) in customary amounts.

EXAMPLES (i) Preparation of Inventive Polyorganosiloxanes

The following inventive polyorganosiloxanes A, B and C were prepared:
Polyorganosiloxane A:
In a first reaction stage, in a three-neck flask, 25.67 g (0.191 mol) of tetramethyldisiloxane and 677.68 g (2.284 mol) of octamethylcyclotetrasiloxane are reacted under an acid-activated calcium bentonite catalyst (3%) to a hydrodimethylpolysiloxane ($M^H D_{55} M^H$).

In the second reaction stage, 234.10 g (0.056 mol) of the hydrodimethylpolysiloxane and 1.59 g of allyl glycidyl ether (0.014 mol) are initially charged and heated to 95° C. This is followed by the addition of the catalyst (7 ppm of Speier's catalyst) and gradual addition of 14.31 g (0.139 mol) of allyl glycidyl ether. The reaction which takes place thereafter proceeds at 100° C. and is monitored by means of an infrared spectroscopic HSi measurement. If no HSi is detectable any longer, the reaction is complete, and excess constituents are distilled.

In the third reaction stage, 100 g of the product formed in stage 2 are heated to 80° C. with a catalyst (1,4-diazabicyclo[2.2.2]octane 0.5%) and an inhibitor (butylhydroxytoluene 0.2%), and 3.91 g of methacrylic acid are slowly added dropwise. The reaction which takes place thereafter proceeds at 95° C. and is monitored via the acid number. On completion of reaction, excess constituents are removed by means of a distillation.

A is thus a long-chain, di-end-functionalized polyorganosiloxane (derived from $M^H{}_2D_{55}$ by reaction with allyl glycidyl ether and then opening of the glycidyl ether with methacrylic acid).

Polyorganosiloxane B:

In a first reaction stage, in a three-neck flask, 69.7 g (0.519 mol) of tetramethyldisiloxane and 636.63 g (2.146 mol) of octamethylcyclotetrasiloxane are reacted under an acid-activated calcium bentonite catalyst (3%), to give a hydro-dimethylpolysiloxane ($M^HD_{18.2}M^H$).

In the second reaction stage, 212.75 g (0.143 mol) of the hydrodimethylpolysiloxane are initially charged and heated to 50° C. This is followed by the addition of the catalyst (8 ppm of Speier's catalyst) and gradual addition of 37.25 g (0.327 mol) of allyl glycidyl ether. The reaction which takes place thereafter proceeds at 60° C. and is monitored by means of an infrared spectroscopic HSi measurement. If no HSi is detectable any longer, the reaction is complete, and excess constituents are distilled.

In the third reaction stage, 100 g of the product formed in stage 2 are heated to 80° C. with a catalyst (1,4-diazabicyclo[2.2.2]octane 0.5%) and an inhibitor (butylhydroxytoluene 0.2%), and 10.25 g of methacrylic acid are slowly added dropwise. The reaction which takes place thereafter proceeds at 95° C. and is monitored via the acid number. On completion of reaction, excess constituents are removed by means of a distillation.

B is a (di-end-functionalized) polyorganosiloxane which corresponds to A except that it is short.

Polyorganosiloxane C:

In a first reaction stage, in a three-neck flask, 44.15 g (0.018 mol) of polyhydromethylsiloxane, 47.06 g (0.350 mol) of tetramethyldisiloxane and 611.07 g (2.060 mol) of octamethyl-cyclotetrasiloxane are reacted under trifluoromethanesulfonic acid (0.004%) to a hydrodimethylpolysiloxane ($M^H{}_{1.95}D^H{}_2M_{0.1}D_{24}$).

In the second reaction stage, 327.14 g (0.160 mol) of the hydrodimethylpolysiloxane are initially charged and heated to 70° C. This is followed by the addition of the catalyst (10 ppm of Speier's catalyst) and gradual addition of 78.26 g (0.686 mol) of allyl glycidyl ether. The reaction which takes place thereafter proceeds at 90° C. and is monitored by means of an infrared spectroscopic HSi measurement. If no HSi is detectable any longer, the reaction is complete, and excess constituents are distilled.

In the third reaction stage, 260.82 g (0.105 mol) of the product formed in stage 2 are heated to 80° C. with a catalyst (1,4-diazabicyclo[2.2.2]octane 0.5%) and an inhibitor (butylhydroxytoluene 0.2%), and 39.18 g (0.455 mol) of methacrylic acid are slowly added dropwise. The reaction which takes place thereafter proceeds at 95° C. and is monitored via the acid number. On completion of reaction, excess constituents are removed by means of a distillation.

C is a short, di-end- and di-pendant-functionalized polyorganosiloxane (derived from $M^H{}_{1.95}D^H{}_2M_{0.1}D_{24}$).

(ii) Production of Vulcanization Mixtures 100 parts by weight of EPDM rubber (Keltan 2340 A), 100 phr of calcined kaolin (Polestar 200 R) and 30 phr of paraffinic mineral oil (Sunpar 2280) were used to produce a mixture in the upside-down mixing process.

Subsequently, the mixture was divided into 6 equal portions by weight, and 6 phr of peroxide (Trigonox 101-45B-pd) was mixed in on a roller system. Only 6 phr of peroxide (Trigonox 101-45B-pd) were added to one portion by weight (control/blank sample, No. 1). 6 phr of peroxide (Trigonox 101-45B-pd) and a particular amount of polyorganosiloxane and/or processing aid and/or coagent were mixed into each of the five further portions by weight with a roller system (see table 1 below).

TABLE 1

| Vulcanization mixture | Polyorganosiloxane | Processing aid | Coagent[e] |
|---|---|---|---|
| 1[a] | — | — | — |
| 2[b] | — | 2 phr Struktol WS 180 | 2 phr TAC 70% DL |
| 3[c] | — | — | 2 phr TAC 70% DL |
| 4[d] | 2 phr A | — | — |
| 5[d] | 2 phr B | — | — |
| 6[d] | 2 phr C | — | — |

[a]Comparative: Vulcanization mixture without polyorganosiloxane (blank sample), without processing aid and without coagent.
[b]Comparative: With 2 phr of conventional Struktol ® WS 180 processing aid and 2 phr of TAC coagent.
[c]Comparative: With 2 phr of TAC coagent.
[d]Inventive.
[e]Dry Liquid composed of 70% TAC with silica as support material The Mooney viscosity and further rheological properties of the vulcanization mixtures thus obtained are reported below in table 2.

TABLE 2

| | 1 | 2 | 3 | 4 | 5 | 6 |
|---|---|---|---|---|---|---|
| Mooney ML (1 + 4) 100° C. (ME)[a] | 36 | 32 | 36 | 35 | 35 | 35 |
| Mooney scorch ML 135° C. TS5 (min) | 25.1 | 25.5 | 24.6 | 22.0 | 21.7 | 20.2 |
| Rheometer MDR 2000[b] At 180° C., measurement time: 20 min | | | | | | |
| Torque ML (dNm) | 0.54 | 0.43 | 0.55 | 0.51 | 0.5 | 0.53 |
| Torque MH (dNm) | 14.89 | 16.8 | 17.53 | 15.86 | 14.64 | 17.2 |
| tc 10% (min) | 0.69 | 0.81 | 0.75 | 0.68 | 0.71 | 0.69 |
| tc 90% (min) | 6.64 | 7.19 | 6.64 | 7.02 | 7.11 | 6.96 |
| Loss factor tan delta (MH) | 0.05 | 0.03 | 0.03 | 0.03 | 0.04 | 0.03 |
| At 200° C., measurement time: 5 min | | | | | | |
| Torque ML (dNm) | 0.56 | 0.44 | 0.59 | 0.54 | 0.57 | 0.61 |
| Torque MH (dNm) | 13.17 | 15.38 | 15.36 | 13.47 | 13.39 | 14.57 |
| tc 10% (min) | 0.34 | 0.35 | 0.34 | 0.33 | 0.33 | 0.33 |
| tc 90% (min) | 1.38 | 1.4 | 1.42 | 1.39 | 1.38 | 1.39 |
| Loss factor tan delta (MH) | 0.05 | 0.04 | 0.04 | 0.05 | 0.05 | 0.04 |

[a]DIN 53523 Part 3: Testing of rubber and elastomers; testing with the Mooney shearing disk viscometer; determining the Mooney viscosity.
[b]Manufacturer: Alpha Technologies, Akron, Ohio, USA.

The results for the Mooney viscosity show that they remain essentially unchanged in spite of use of the polyorganosiloxanes as an additive in inventive experiments 4 to 6.

(v) Production of Vulcanizates

Vulcanization mixtures 1 to 6 were used to produce test sheets of thickness 2 mm and 6 mm, which were vulcanized at 180° C. The test specimens 1 to 6 obtained showed the properties listed in table 3.

TABLE 3

| Properties of the vulcanizate | 1 | 2 | 3 | 4 | 5 | 6 |
|---|---|---|---|---|---|---|
| 2 mm vulc. time (min) | 20 | 20 | 20 | 20 | 20 | 20 |
| 6 mm vulc. time (min) | 22 | 22 | 22 | 22 | 22 | 22 |
| Hardness SH A (SH E) | 51 | 54 | 55 | 54 | 54 | 55 |
| Tensile strength (MPa)[a] | 4.6 | 3.4 | 4.2 | 4.3 | 3.6 | 5.6 |
| Elongation at break (%)[a] | 548 | 393 | 351 | 390 | 457 | 369 |
| 100% modulus[a] | 1.7 | 1.8 | 2.1 | 2.1 | 1.9 | 2.4 |
| 300% modulus[a] | 3 | 2.9 | 4 | 4 | 3 | 5.1 |
| CS 24 h/100° C. 25% (%)[b] | 12.2 | 8.7 | 7.7 | 7.4 | 9 | 7.6 |
| CS 3 d/70° C. 25% (%)[b] | 13.1 | 8.2 | 8 | 8.9 | 10.3 | 8 |
| Trouser tear propagation resistance (kN/m)[c] | 2.9 | 2.4 | 2.4 | 2.9 | 2.5 | 2.8 |

[a]DIN 53504: Testing of rubber - determination of tensile strength at break, tensile stress at yield, elongation at break and stress values in a tensile test. Modulus values in MPa.
[b]DIN ISO 815: Determination of compression set at ambient, elevated and low temperatures:
[c]DIN ISO 34-1: Elastomeric or thermoplastic elastomers - determination of tear propagation resistance.

What is remarkable about inventive experiments 4 to 6 compared to the base mixture (comparative experiment 1) and comparative experiments 2 and 3 is that the mechanical properties can be improved. For instance, experiment 6 exhibits a distinct improvement in tensile strength, without any great fall in elongation at break. Experiment 5 shows—compared to experiment 2—an unchanged or even slightly improved tensile strength, while the elongation at break is distinctly improved. Experiment 4 then shows—again compared to experiment 2—a distinct improvement in tensile strength with essentially unchanged elongation at break.

The invention claimed is:

1. A method of processing rubber, said method comprising:
reacting said rubber with a polyorganosiloxane additive having 3 or more siloxane units, said polyorganosiloxane having one or more organic moieties $R^1$, and having the following structure:

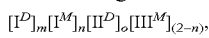

where
(i) m is in the range from 0 to 40 and n is 1 or 2,
(ii) o is in the range from 0 to 1000,
(iii) the sum (m+o+2) is at least 3,
(iv) $[I^D]$ is the difunctional structural unit $[R^1RSiO_{2/2}]$ where R is a monovalent organic radical,
(v) $[I^M]$ is the monofunctional structural unit $[R^1R_2SiO_{1/2}]$ where R is a monovalent organic radical,
(vi) $[II^D]$ is the difunctional structural unit $[R'_2SiO_{2/2}]$ where the R' radicals are the same or different and are each a methyl, an ethyl, a propyl or a phenyl,
(vii) $[III^M]$ is the monofunctional structural unit $[R''_3SiO_{1/2}]$ where the R'' radicals are the same or different and are each selected from hydroxyl methyl, ethyl, propyl or phenyl,
$R^1$ has one or more carbon-carbon multiple bonds and has at least 4 carbon atoms, and
the presence of one or more hydrocarbon moieties having a chain length of 5 to 50 carbon atoms in the polyorganosiloxane is excluded,
wherein the processing is a peroxidic vulcanization of said rubber, the amount of polyorganosiloxane used being 0.1 to 10 phr.

2. The method of claim 1, wherein the carbon-carbon multiple bond is a double bond.

3. The method of claim 1, wherein the organic moiety $R^1$ is a monovalent radical.

4. The method of claim 3, wherein the $R^1$ radical is (x), (y) or (z):

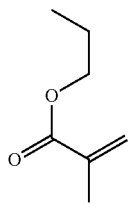

(x)

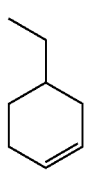

(y)

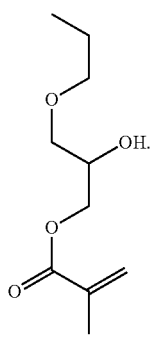

(z)

5. The method of claim 1, wherein the polyorganosiloxane has the structural unit I

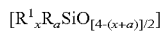  (I), where x is 1, 2 or 3, a is 0, 1 or 2, and R is a monovalent organic radical.

6. The method of claim 1, wherein m is 2.

7. The method of claim 1, wherein said additive is used to improve the release performance on a roller system or in an internal mixer, to reduce the Mooney viscosity, to increase the modulus of the vulcanized rubber mixture, tensile strength, to reduce the compression set, to reduce elongation at break and/or to reduce tear propagation resistance.

8. The method of claim 1, wherein the rubber is selected from NR, BR, NBR, HNBR, EPM, EPDM, CR, PE, CM, CSM, GECO, FKM, FFKM, TFE/P, ACM, AEM, EVA, EVM, VMQ, PMQ, PVMQ, FVMQ, and TPE.

9. The method of claim 1, wherein a masterbatch is used which comprises
a) one or more rubbers and
b) one or more of the polyorganosiloxanes.

10. The method of claim 1, wherein a blend is used which comprises
a) one or more solid carrier materials and
b) one or more of the polyorganosiloxanes.

11. A process for vulcanizing rubber, in which a vulcanization mixture comprising
(i) one or more peroxidically crosslinkable rubbers,
(ii) one or more peroxidic vulcanizing agents, and
(iii) one or more polyorganosiloxanes, the amount of polyorganosiloxane used being 0.1 to 10 phr,
is peroxidically vulcanized,
said polyorganosiloxanes having 3 or more siloxane units and one or more organic moieties $R^1$, and having the following structure:

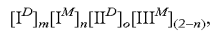

where:
(a) m is in the range from 0 to 40 and n is 1 or 2,
(b) o is in the range from 0 to 1000,
(c) the sum (m+o+2) is at least 3,
(d) $[I^D]$ is the difunctional structural unit $[R^1RSiO_{2/2}]$ where R is a monovalent organic radical,
(e) $[I^M]$ is the monofunctional structural unit $[R^1R_2SiO_{1/2}]$ where R is a monovalent organic radical,
(f) $[II^D]$ is the difunctional structural unit $[R'_2SiO_{2/2}]$ where the R' radicals are the same or different and are each a methyl, an ethyl, a propyl or a phenyl,
(g) $[III^M]$ is the monofunctional structural unit $[R''_3SiO_{1/2}]$ where the R'' radicals are the same or different and are each selected from hydroxyl methyl, ethyl, propyl or phenyl,
(h) $R^1$ has one or more carbon-carbon multiple bonds and has at least 4 carbon atoms, and
(i) the presence of one or more hydrocarbon moieties having a chain length of 5 to 50 carbon atoms in the polyorganosiloxane is excluded.

12. A vulcanized rubber produced by the process of claim 11.

13. A vulcanized rubber produced by the method of claim 1.

* * * * *